(12) United States Patent
Valk et al.

(10) Patent No.: US 6,545,236 B2
(45) Date of Patent: Apr. 8, 2003

(54) VEHICLE INTERIOR COMPONENT HAVING A FLEXIBLE COVER WITH INTEGRATED CIRCUITRY

(75) Inventors: Mary Ann T. Valk, Glastonbury, CT (US); David J. Sirag, Jr., Ellington, CT (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/779,106

(22) Filed: Feb. 7, 2001

(65) Prior Publication Data

US 2002/0104746 A1 Aug. 8, 2002

(51) Int. Cl.⁷ .............................................. H01H 9/00
(52) U.S. Cl. .................................. 200/61.54; 200/514
(58) Field of Search ............................. 200/61.54, 514

(56) References Cited

U.S. PATENT DOCUMENTS

| | | |
|---|---|---|
| 4,075,616 A | 2/1978 | Rait |
| 4,524,256 A | 6/1985 | Miyata et al. |
| 4,565,910 A | 1/1986 | Musick et al. ............. 200/85 R |
| 4,623,766 A | 11/1986 | Utagawa et al. |
| 4,661,664 A | 4/1987 | Miller |
| 4,701,629 A | 10/1987 | Citroën |
| 4,845,323 A | 7/1989 | Beggs |
| 5,047,602 A | 9/1991 | Lipka |
| 5,251,135 A | 10/1993 | Serizawa et al. |
| 5,324,898 A | 6/1994 | McCormack et al. |
| 5,335,743 A | 8/1994 | Gillbrand et al. |
| 5,349,569 A | 9/1994 | Tanaka |
| 5,423,569 A | 6/1995 | Reighard et al. .... 200/61.54 X |
| 5,448,028 A | * 9/1995 | Filion et al. ......... 200/302.1 X |
| 5,554,835 A | 9/1996 | Newham |
| 5,569,893 A | * 10/1996 | Seymour ................. 200/61.54 |
| 5,666,857 A | 9/1997 | Sebazco |
| 5,756,950 A | * 5/1998 | De Filippo .............. 200/61.54 |
| 5,810,107 A | 9/1998 | Krel |
| 5,909,804 A | * 6/1999 | Kuratani ..................... 200/516 |
| 5,986,622 A | 11/1999 | Ong |
| 6,371,572 B1 | 4/2002 | Frank |

FOREIGN PATENT DOCUMENTS

| | | |
|---|---|---|
| DE | 3441129 A1 | 5/1986 |
| GB | 1365652 | 9/1974 |
| GB | 2328188 A | 2/1999 |
| WO | 98/03372 | 1/1998 |

OTHER PUBLICATIONS

E. Rehmi Post and Maggie Orth, "Smart Fabric, or Washable Computing", Jan. 9, 2001, pp. 1–6 http://www.media.mit.edu/~rehmi/fabric/index.html.

Peronet Despeignes, "Smart homes aren't too far into future", *The Detroit News*, Sep. 2, 2000 http://detnews.com/specialreports/2000/technology/smart/smart.htm.

* cited by examiner

*Primary Examiner*—Renee Luebke
(74) *Attorney, Agent, or Firm*—Bill C. Panagos

(57) ABSTRACT

A vehicle interior component for use with a vehicle having a vehicle system includes a substrate and a flexible cover covering a portion of the substrate. The cover includes a cover material and electronic circuitry integrated with the cover material and adapted to communicate with the vehicle system. Moreover, the cover material and the electronic circuitry cooperate to define at least one control switch for controlling operation of the vehicle system.

28 Claims, 3 Drawing Sheets

VEHICLE INTERIOR COMPONENT HAVING A FLEXIBLE COVER WITH INTEGRATED CIRCUITRY

BACKGROUND OF THE INVENTION

1. Field of the Invention

The invention relates to a vehicle interior component having a flexible cover that includes a cover material and electronic circuitry integrated with the cover material, wherein the cover material and the circuitry cooperate to define at least one control switch for controlling operation of a vehicle system.

2. Background Art

Prior vehicle interior components, such as steering wheels and door panels, include mechanical buttons that can be used to control vehicle systems, such as stereo systems, cruise control systems, lock systems, window systems and mirror systems. Because such components may be in frequent contact with human hands, the buttons may be exposed to a high degree of dirt and oil. Furthermore, dirt, food and clothing fibers may also become caught in crevices of the buttons. Over time, the accumulation of such debris may adversely affect functionality of the buttons.

In addition, surfaces of such components may not be flat and/or smooth. As a result, it may be difficult to locate buttons in the most user friendly positions.

SUMMARY OF THE INVENTION

The invention addresses the shortcomings of the prior art by providing a vehicle interior component that includes a flexible cover having at least one integrated control switch for controlling a vehicle system. Because the at least one control switch is part of the cover, debris accumulating crevices associated with prior art mechanical buttons are effectively reduced or eliminated. Furthermore, because the cover is flexible, the cover can easily conform to a desired shape. As a result, the at least one control switch may be located in various desired positions.

Under the invention, a vehicle interior component for use with a vehicle having a vehicle system includes a substrate and a flexible cover covering a portion of the substrate. The cover includes a cover material and electronic circuitry integrated with the cover material and adapted to communicate with the vehicle system. Moreover, the cover material and the circuitry cooperate to define at least one control switch for controlling operation of the vehicle system.

Further under the invention, a steering wheel for use with a vehicle having a vehicle system includes a steering wheel body, and a flexible cover covering a portion of the body. The cover includes a cover material and electronic circuitry integrated with the cover material and adapted to communicate with the vehicle system. Moreover, the cover material and the circuitry cooperate to define at least one control switch for controlling operation of the vehicle system.

In each of the above embodiments, the cover material may comprise any suitable material such as cloth, leather and/or vinyl. Furthermore, the cover material defining the at least one control switch may include fluorescent material so that the at least one control switch may be easily located in low lighting conditions.

The electronic circuitry in each of the above embodiments may include any suitable circuitry that is integrated with the cover material in any suitable manner. For example, the electronic circuitry may include conductive traces that are woven into the cover material. As another example, the electronic circuitry may include conductive ink that is applied directly to the cover material, or to a support layer that is attached to the cover material. Furthermore, the electronic circuitry may include piezo transducers that allow current to flow when sufficiently pressed.

In each of the above embodiments, the cover may further include an additional cover material and an insulating layer disposed between the cover material and the additional cover material. Moreover, the electronic circuitry may include first and second conductive traces, wherein the first conductive trace is attached to the cover material, and the second conductive trace is attached to the additional cover material. With such a configuration, the first and second conductive traces may contact each other when sufficient pressure is applied to the cover proximate a hole in the insulating layer.

These and other objects, features and advantages of the invention are readily apparent from the following detailed description of the preferred embodiments for carrying out the invention, when taken in conjunction with the accompanying drawings.

DETAILED DESCRIPTION OF THE PREFERRED EMBODIMENT(S)

Figure 1:
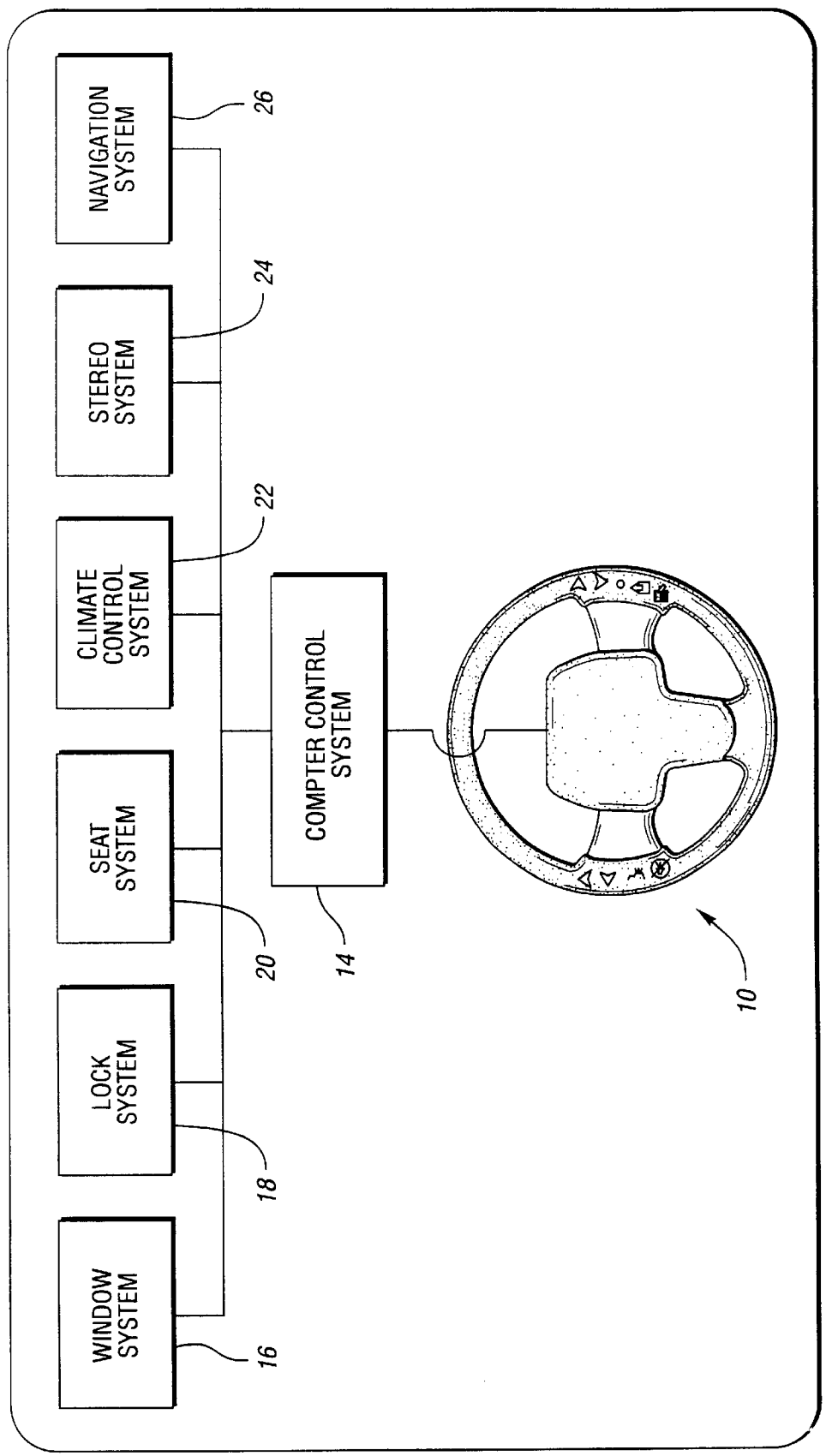
FIG. 1 is a schematic diagram of a steering wheel according to the invention in communication with a computer control system and a plurality of vehicle systems.

FIG. 1 shows a steering wheel 10 according to the invention for use with a motor vehicle 12 having a control system, such as a computer control system 14. The computer control system 14 is in communication with a plurality of vehicle systems, such as a window system 16, lock system 18, seat system 20, climate control system 22, stereo system 24, navigation system 26, and the like. Furthermore, the computer control system 14 is configured to control operation of the vehicle systems 16–26. The computer control system 14 may also include a display device for displaying a plurality of menus for use in controlling one or more of the vehicle systems 16–26. In one embodiment of the invention, the computer control system 14 is an AutoPC™ available from Clarion Corporation of America, located in Gardena, Calif.

Figure 2:
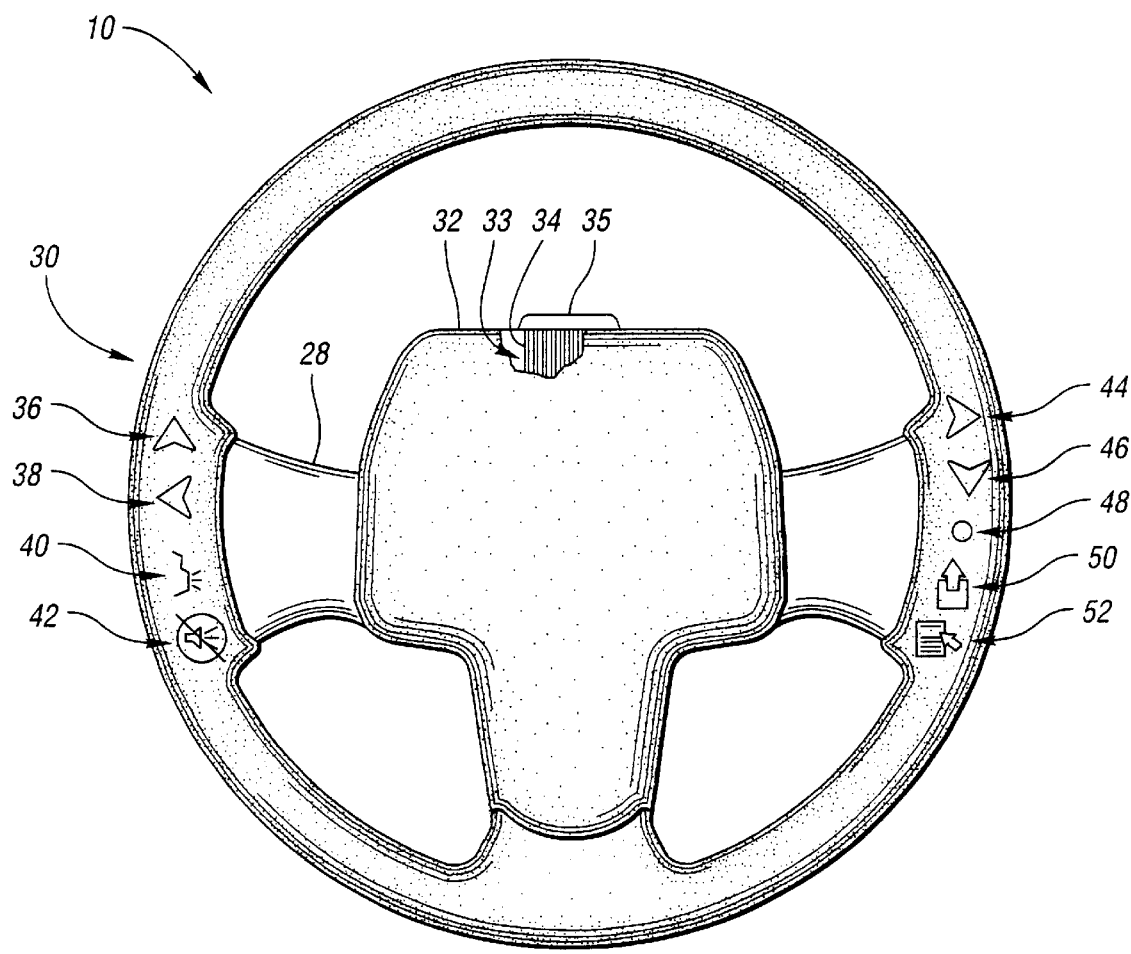
FIG. 2 is a front view of the steering wheel showing a steering wheel body and a cover covering a portion of the body.
Figure 3:
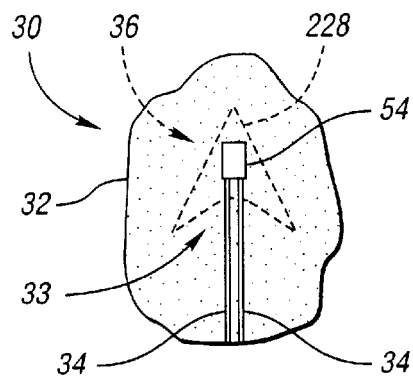
FIG. 3 is a fragmentary bottom view of the cover showing a cover material and electronic circuitry integrated with the cover material.

Referring to FIGS. 2 and 3, the steering wheel 10 includes a steering wheel substrate or body 28 and a flexible cover 30 surrounding at least a portion of the body 28. The cover 30 may be permanently attached to the body 28, such as with adhesive, or the cover 30 may be removably mounted on the body 28. For example, the cover 30 may have an elastic configuration or characteristic that allows the cover 30 to be easily positioned on and removed from the body 28. As another example, the cover 30 may be sewn around the body 28.

The cover 30 includes a flexible cover material 32 and flexible electronic circuitry 33 integrated with the cover material 32. In the embodiment shown in FIG. 3, the cover material 32 includes cloth, and the electronic circuitry 33 includes conductive paths or traces 34 woven into the cover material 32. For example, the conductive traces 34 may include silk thread, or other suitable thread, wrapped in thin copper foil, or other suitable conductive material. Alternatively, the conductive traces 34 may include any suitable conductive material, such as conductive yarn, that is woven into or otherwise integrated with the cover material 32. One known supplier of conductive fabric is Bekaert Corporation of Akron, Ohio.

The electronic circuitry 33 is in communication with the computer control system 14 and the vehicle systems 16–26. For example, as shown in FIG. 2, the electronic circuitry 33 may include a transmitter 35 for establishing a wireless connection with the computer control system 14. As another example, the electronic circuitry 33 may be connected directly to the computer control system 14, as shown in FIG. 1.

In addition, the electronic circuitry 33 cooperates with the cover material 32 to define a plurality of control switches, such as keys or buttons, that may be used in conjunction with the computer control system 14 for controlling operation of the vehicle systems 16–26. For example, referring to FIG. 2, the cover material 32 and the electronic circuitry 33 may cooperate to define up arrow button 36, left arrow button 38, speech recognition button 40, mute button 42, right arrow button 44, down arrow button 46, enter button 48, back-up or escape button 50, and menu button 52. The menu button 52 may be used to scroll through a plurality of menus that are displayed on the display device of the computer control system 14. The escape button 50 may be used to back-up to a previous menu. The arrow buttons 36, 38, 44 and 46 may be used to scroll through items included in a particular menu. Enter button 48 may be used to select a particular item from a particular menu, such as a volume control for the stereo system 24. Speech recognition button 40 may be used to activate a speech recognition system of the computer control system 14, so that the vehicle systems 16–26 may be controlled by audible commands. Finally, mute button 42 may be used to temporarily suspend sound from the stereo system 24. Alternatively, the cover 30 may be provided with any suitable control switches that may be used to directly control one or more vehicle systems 16–26, or that may be used in conjunction with the computer control system 14 to control one or more of the vehicle systems 16–26.

In the embodiment shown in FIG. 3, the electronic circuitry 33 includes a plurality of piezo transducers 54 that are attached to the conductive traces 34 and cooperate with the cover material 32 to define the buttons 36–52 (only one transducer 54 and one button, the up arrow button 36, are shown in FIG. 3). In one embodiment of the invention, the transducers 54 are piezoceramic transducers available from Piezo Systems, Inc. of Cambridge, Mass. While the transducers 54 may be attached to the conductive traces 34 in any suitable manner, in one embodiment of the invention, the transducers 54 are soldered to the conductive traces 34. When sufficient pressure is applied to a particular transducer 54, the transducer 54 allows current to flow through the corresponding conductive traces 34.

Because the buttons 36–52 are incorporated into the cover 30, debris accumulating crevices associated with prior art mechanical buttons are effectively reduced or eliminated. Furthermore, because the cover 30 is flexible, the cover 30 can easily conform to the shape of the body 28. As a result, the buttons 36–52 may be located in virtually any desired positions.

Figure 4:
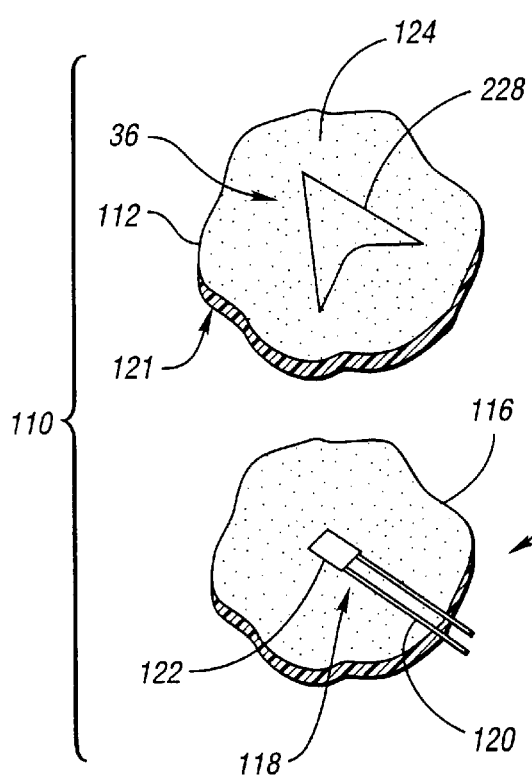
FIG. 4 is a fragmentary exploded perspective view of a second embodiment of the cover.

FIG. 4 shows a second embodiment 110 of the cover, which includes a cover material 112 and an electronic circuitry layer 114 integrated with the cover material 112. The cover material 112 may be any suitable material such as cloth, leather or vinyl. The electronic circuitry layer 114 includes a flexible support layer 116, such as a cloth layer, that is attached to the cover material 112 in any suitable manner. For example, the support layer 116 may be sewn onto the cover material 112, and/or adhesively attached to the cover material 112. Furthermore, the electronic circuitry layer 114 includes electronic circuitry 118 attached to or otherwise integrated with the support layer 116. For example, the electronic circuitry 118 may include conductive traces 120 that are integrated with the support layer 116 in a similar manner as described above with respect to the cover 30. As another example, the conductive traces 120 may be printed or silks-screened onto a surface of the support layer 116 using conductive ink. Alternatively, the support layer 116 may be eliminated, and the conductive traces 120 may be printed or silk-screened onto a back surface 121 of the cover material 112 using conductive ink. Furthermore, the electronic circuitry 118 may include one or more transducers 122 connected to the conductive traces 120. In any case, the cover material 112 and the electronic circuitry 118 may cooperate to define one or more control switches, such as the buttons 36–52 described above (only up arrow button 36 is shown in FIG. 4).

Advantageously, with the configuration described above, the cover material 112 may act as a buffer between the electronic circuitry 118 and anyone or anything that comes into contact with an appearance surface 124 of the cover material 112. Furthermore, because the electronic circuitry 118 may be integrated with the support layer 116, or applied to the back surface 121 of the cover material 112, the cover 110 is especially useful with applications in which it is not practical or desirable to weave electronic circuitry directly into the cover material 112.

Figure 5:
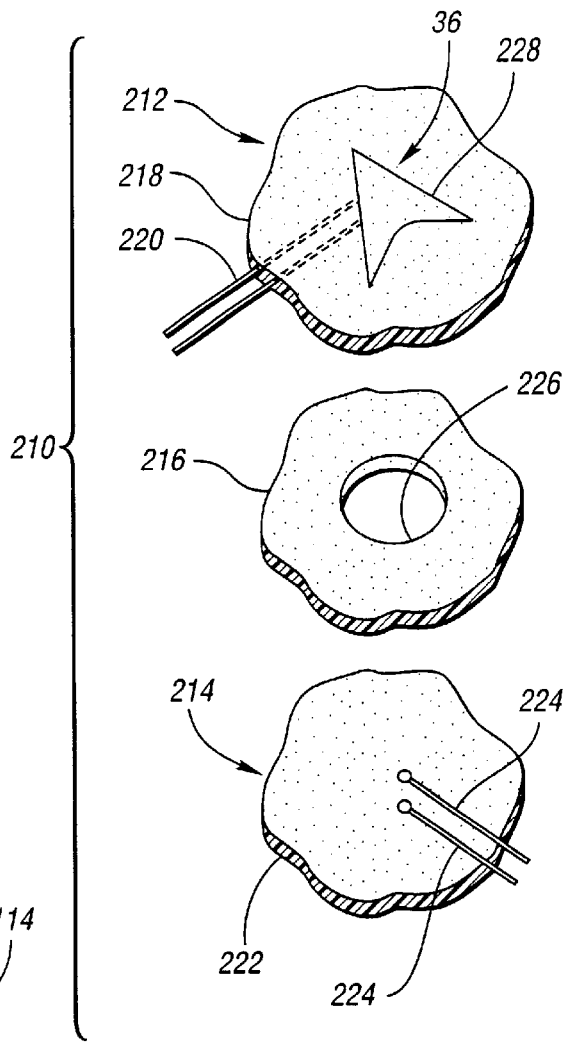
FIG. 5 is a fragmentary exploded perspective view of a third embodiment of the cover.

FIG. 5 shows a third embodiment 210 of the cover, which includes first and second layers 212 and 214, respectively, separated by an insulating layer 216. The first layer 212 includes a first cover material 218, such as cloth, leather, or vinyl, and electronic circuitry, such as a plurality of first conductive traces 220, integrated with the first cover material 218. For example, the first conductive traces 220 may be integrated with the first cover material 118 in a similar manner as described above with respect to the cover 30 or the cover 110.

The second layer 214 includes a second cover material 222, such as cloth, leather, or vinyl, and electronic circuitry, such as a plurality of second conductive traces 224, integrated with the second cover material 222. For example, the second conductive traces 224 may be integrated with the second cover material 222 in a similar manner as described above with respect to the cover 30 or the cover 110.

The insulating layer 216 may include any suitable insulating material such as felt, velvet or quilt batting. Furthermore, one or more holes 226 in the insulating layer 216 allow the first conductive traces 220 to make contact with the second conductive traces 224 when the first and second layers 212 and 214, respectively, are sufficiently pressed together. With such a configuration, the first and second layers 212 and 214, respectively, and the insulating layer 216 may cooperate to define one or more control switches, such as the buttons 36–52 described above (only up arrow button 36 is shown in FIG. 5). Advantageously, the insulating layer 216 may also provide a springy, button-like mechanical effect.

In each of the embodiments described above, the cover material 32, 112, or 218 may include flourescent stitching 228 or other flourescent material, so that the buttons 36–52 may be easily located in low lighting conditions. Furthermore, embossed labels may be attached to the cover material 32, 112, or 218 to assist in locating the buttons 36–52 without visual inspection.

The invention may also be applied to vehicle interior components other than steering wheels. Examples of other such components include seats, door panels, instrument panels, consoles, flooring systems, and trunk liners. Each of these components may include a substrate or body and a cover, similar to one of the covers 30, 110, or 210 described above, that covers at least a portion of the body. Such a cover may include one or more control switches that may be used to directly control one or more vehicle systems, such as the vehicle systems 16–26, or that may be used in conjunction with a control system, such as computer control system 14, to control one or more vehicle systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle interior component for use with a vehicle having a vehicle system, the component comprising:
    a substrate; and
    a flexible cover covering a portion of the substrate, the cover including a cover material and electronic circuitry integrated with the cover material and adapted to communicate with the vehicle system, the cover material and the electronic circuitry cooperating to define at least one control switch for controlling operation of the vehicle system, wherein the cover material includes fluorescent stitching for defining a portion of the at least one control switch.

2. The vehicle interior component of claim 1 wherein the cover material comprises cloth.

3. The vehicle interior component of claim 1 wherein the cover material comprises leather.

4. The vehicle interior component of claim 1 wherein the cover material comprises vinyl.

5. The vehicle interior component of claim 1 wherein the electronic circuitry defining the at least one control switch includes at least one piezo transducer.

6. The vehicle interior component of claim 1 wherein the electronic circuitry includes conductive traces woven into the cover material.

7. The vehicle interior component of claim 6 wherein the electronic circuitry defining the at least one control switch further includes at least one piezo transducer, each transducer being connected to two conductive traces.

8. The vehicle interior component of claim 6 wherein the electronic circuitry further includes a transmitter connected to the conductive traces and adapted to communicate with the vehicle system via a wireless connection.

9. The vehicle interior component of claim 1 wherein the electronic circuitry includes conductive ink.

10. The vehicle interior component of claim 9 wherein the cover material includes an appearance surface and a back surface, and the conductive ink is applied to the back surface of the cover material.

11. The vehicle interior component of claim 1 wherein the cover further includes an additional cover material and an insulating layer disposed between the cover material and the additional cover material, the insulating layer having a hole extending therethrough, and wherein the electronic circuitry includes first and second conductive traces, the first conductive trace being attached to the cover material, the second conductive trace being attached to the additional cover material, wherein when sufficient pressure is applied to the cover proximate the hole, the first and second conductive traces contact each other.

12. The vehicle interior component of claim 1 wherein the cover has an elastic characteristic that enables the cover to be positioned on and removed from the substrate.

13. A steering wheel for use with a vehicle having a vehicle system, the steering wheel comprising:
    a steering wheel body; and
    a flexible cover covering a portion of the body, the cover including a cover material and electronic circuitry integrated with the cover material and adapted to communicate with the vehicle system, the cover material and the electronic circuitry cooperating to define at least one control switch for controlling operation of the vehicle system, wherein the electronic circuitry includes conductive traces woven into the cover material.

14. The steering wheel of claim 13 wherein the cover material comprises cloth.

15. The steering wheel of claim 13 wherein the cover material defining the at least one control switch includes fluorescent material.

16. The steering wheel of claim 13 wherein the electronic circuitry defining the at least one control switch includes at least one piezo transducer.

17. The steering wheel of claim 13 wherein the cover further includes an additional cover material and an insulating layer disposed between the cover material and the additional cover material, the insulating layer having a hole extending therethrough, and wherein the electronic circuitry includes first and second conductive traces, the first conductive trace being attached to the cover material, the second conductive trace being attached to the additional cover material, wherein when sufficient pressure is applied to the cover proximate the hole, the first and second conductive traces contact each other.

18. The steering wheel of claim 17 wherein the second conductive trace includes conductive ink.

19. The steering wheel of claim 13 wherein the electronic circuitry further includes a transmitter connected to the conductive traces and adapted to communicate with the vehicle system via a wireless connection.

20. The steering wheel of claim 13 wherein the cover has an elastic characteristic that enables the cover to be positioned on and removed from the body.

21. The steering wheel of claim 13 wherein the cover material defining the at least one control switch includes fluorescent stitching.

22. A steering wheel for use with a vehicle having a control system in communication with a vehicle system, the steering wheel comprising:
    a steering wheel body; and
    a flexible cover surrounding a portion of the body, the cover including a cover material and electronic circuitry integrated with the cover material and adapted to communicate with the control system, the cover material and the electronic circuitry cooperating to define at least one control switch for controlling operation of the vehicle system, wherein the cover material includes leather and flourescent stitching attached to the leather for defining a portion of the at least one control switch, and wherein the electronic circuitry includes conductive ink applied to the cover material.

23. A vehicle interior component for use with a vehicle having a vehicle system, the vehicle interior component comprising:

a substrate; and a flexible cover covering a portion of the substrate, the cover including a cover material and electronic circuitry integrated with the cover material and adapted to communicate with the vehicle system, the cover material and the electronic circuitry cooperating to define a control switch for controlling operation of the vehicle system, wherein the electronic circuitry includes a conductive trace woven into the cover material.

24. The vehicle interior component of claim 23 wherein the cover material comprises cloth.

25. The vehicle interior component of claim 23 wherein the cover material defining the control switch includes fluorescent stitching.

26. The vehicle interior component of claim 23 wherein the electronic circuitry further includes a piezo transducer connected to the conductive trace.

27. The vehicle interior component of claim 23 wherein the cover has an elastic characteristic that enables the cover to be positioned on and removed from the substrate.

28. The vehicle interior component of claim 23 wherein the electronic circuitry further includes a transmitter connected to the conductive trace and adapted to communicate with the vehicle system via a wireless connection.

* * * * *